Dec. 29, 1964 R. BORDWINE ETAL 3,162,884
UNIVERSAL BUTTER DISPENSER
Filed Sept. 9, 1963 2 Sheets-Sheet 1

INVENTORS.
RICHARD WOJCINSKI
RONALD BORDWINE
BY John M. Nolan
ATTORNEY

Dec. 29, 1964  R. BORDWINE ETAL  3,162,884
UNIVERSAL BUTTER DISPENSER
Filed Sept. 9, 1963  2 Sheets-Sheet 2

INVENTORS.
RICHARD WOJCINSKI
RONALD BORDWINE
BY John M. Nolan
ATTORNEY

United States Patent Office 3,162,884
Patented Dec. 29, 1964

3,162,884
UNIVERSAL BUTTER DISPENSER
Ronald Bordwine, 1207 17th St., Rock Island, Ill., and Richard Wojcinski, 624 10th St., Moline, Ill.
Filed Sept. 9, 1963, Ser. No. 307,632
19 Claims. (Cl. 15—514)

This invention relates to a universal butter dispenser and more particularly to a butter or oleomargarine dispenser which is used for storing and dispensing most commercial sticks of butter or oleomargine and also for basting meats, greasing kitchen utensils and buttering corn, toast or any desired object.

Previous butter dispensers have not been able to accommodate an entire one-quarter pound stick of butter or oleomargarine in a form that is generally commercially available, or have not been usable as a buttering device, or have not been able to dispense all the butter in the dispenser, or have been able to apply butter only to heated surfaces, or have had various restraining devices interposed between the butter and the surface to which the butter is to be applied. These disadvantages are all overcome by the present invention.

An object of the present invention is to provide a universal butter dispenser for dispensing butter or oleomargarine or for applying said butter or oleomargarine to any desired object.

A further object of the invention is to provide a universal butter dispenser which will accommodate most one-quarter pound sticks of butter or oleomargarine that are commercially available without altering the dispenser.

Another object of the invention is to provide a butter dispenser which acts as an effective storage vessel for butter or oleomargarine when not in use, preventing contamination of the contents.

Another object of the invention is to provide a butter dispenser which will easily measure out specific amounts of butter or oleomargarine.

Another object of the invention is to provide a butter dispenser which can be used to apply butter to any desired surface, quickly and easily, without waste or mess, whether the surface is hot or cold.

Still another object of the invention is to provide a universal butter dispenser which is simple and easy to load and operate, and which is simple and inexpensive to manufacture.

The foregoing and other objects and advantages of the invention will appear more fully hereinafter from a consideration of the drawings and detailed description which follow. It is to be expressly understood, however, that the drawings are for the purpose of illustration only and are not to be construed as defining the limits of the invention.

In the drawings.

In the drawings similar characters of reference indicate corresponding parts in the several views.

Figure 1:
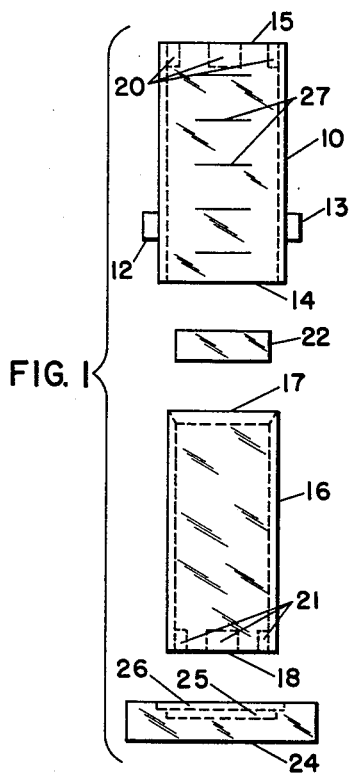
FIGURE 1 is an exploded front view of the butter dispenser.
Figure 2:
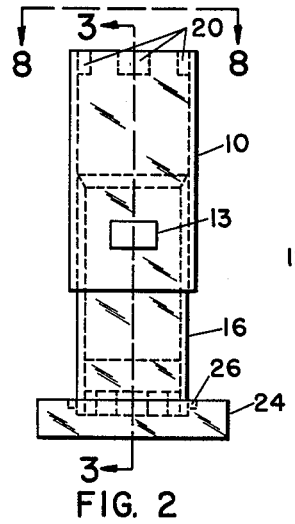
FIGURE 2 is side view of the butter dispenser showing the various parts assembled.
Figure 3:
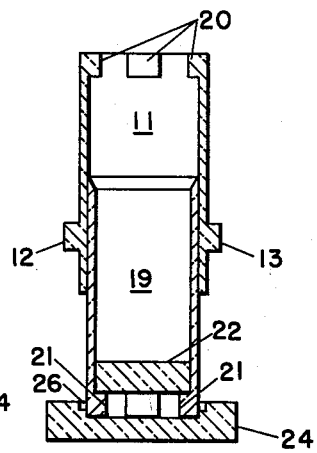
FIGURE 3 is a sectional view taken on line 3—3 of FIGURE 2 showing a stick of butter partly dispensed.
Figure 4:
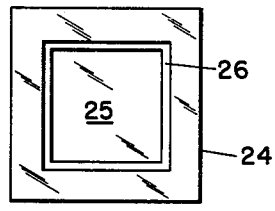
FIGURE 4 is a perspective view of the plunger.
Figure 5:
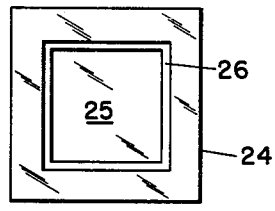
FIGURE 5 is a top view of the base of the butter dispenser.

Referring now to the drawings and in particular to FIGURES 1, 2, 3, 4 and 5, there is shown outer telescoping member 10 forming chamber 11 which has inlet 14 and outlet 15. Tab 12 and tab 13 project from the outer surface of member 10.

There is also shown inner telescoping member 16 which forms chamber 19 which has outlet 17 and inlet 18. Chamber 19 tapers to a slightly larger cross-section at outlet 17 to facilitate the insertion of a butter stick into chamber 19 and to compress any butter stick larger in cross-section than chamber 19. Restricting bosses 20 project into chamber 11 at outlet 15 of outer telescoping member 10.

Figure 6:
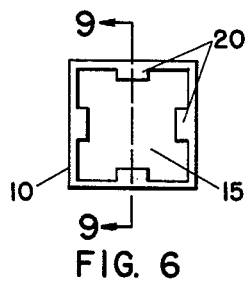
FIGURE 6 is a top view of the outer telescoping member viewed from line 8—8 of FIGURE 2.
Figure 7:
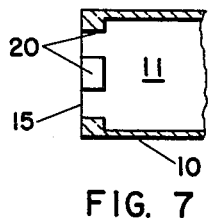
FIGURE 7 is a partial section of the outer telescoping member taken along line 9—9 of FIGURE 6.

FIGURES 6 and 7 show restricting bosses 20 with greater clarity. Additional restricting bosses 21 project into chamber 19 at inlet 18 of inner telescoping member 16. The restricting bosses 20 prevent the butter from extruding from outlet 15 until sufficient force is applied to overcome the retarding effect the restricting bosses exert on the butter.

Plunger 22 is slidably mounted in chamber 19 of inner telescoping member 16. Restricting bosses 21 prevent plunger 22 from falling out inlet 18.

Figure 9:
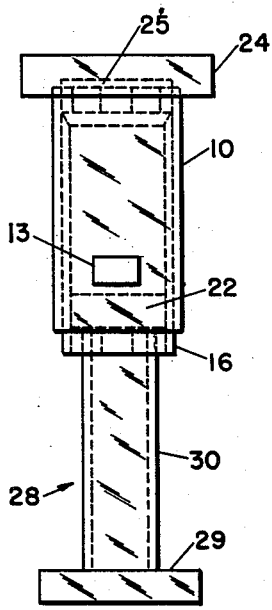
FIGURE 9 is a side view of the butter dispenser using the base-plunger and utilizing the base as a cover.

Base 24 forms inner receptacle 25 and outer receptacle 26. The lower edge of inner telescoping member 16 fits into inner receptacle 25 of base 24 providing a stand to maintain the butter dispenser in an upright position. The upper edge of outer telescoping member 10 fits into outer receptacle 26 as shown in FIGURE 9. When the butter dispenser is not in use base 24 may be placed over outlet 15. The butter in chambers 11 and 19 is thus completely enclosed by outer telescoping member 10, inner telescoping member 16, plunger 22 and base 24, providing an effective storage vessel.

In FIGURE 1 there is also shown measuring marks 27 on outer telescoping member 10.

Figure 8:
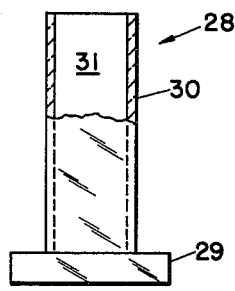
FIGURE 8 is a front view, partly in section, of the base-plunger of the butter dispenser.

Referring now to FIGURE 8 and FIGURE 9 there is shown base-plunger 28 which has a base 29 and a plunging member 30 which slides into chamber 19 of inner telescoping member 16 against plunger 22. Plunging member 30 forms storage chamber 31.

Figure 10:
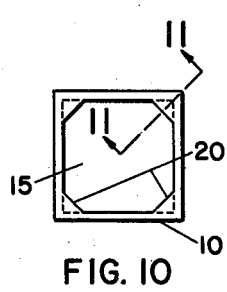
FIGURE 10 is a top view of a slightly different embodiment of the outer telescoping member.
Figure 11:
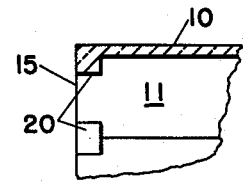
FIGURE 11 is a partial section taken along line 11—11 of FIGURE 10.

Referring now to FIGURES 10 and 11, there is shown a slightly different embodiment of outer telescoping member 10, restricting bosses 20 having a different configuration and being located differently in chamber 11.

Figure 12:
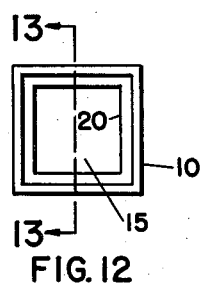
FIGURE 12 is a top view of another embodiment of outer telescoping member.
Figure 13:
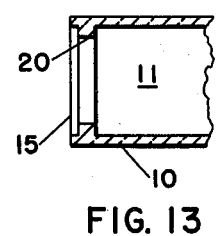
FIGURE 13 is a partial section taken along line 13—13 of FIGURE 12.

FIGURES 12 and 13 show another embodiment of outer telescoping member 10, restricting boss 20 extending around the perimeter of chamber 11 near outlet 15.

Figure 14:
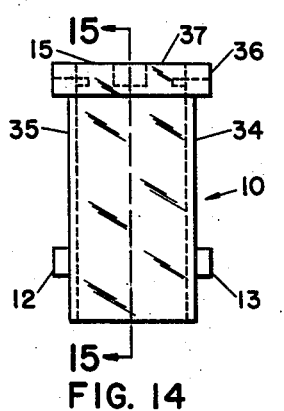
FIGURE 14 is a front of a still another embodiment of the outer telescoping member.
Figure 15:
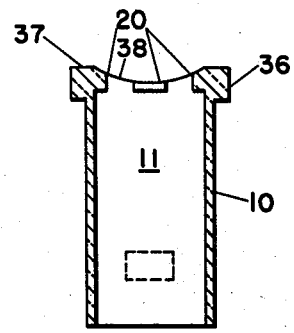
FIGURE 15 is a side view of the embodiment shown in FIGURE 14.

FIGURES 14 and 15 show still another embodiment of outer telescoping member 10 which has side 34 and side 35. Shoulder 36 extends around the entire outside perimeter of outer telescoping member 10 at outlet 15. Wiping surface 37 of shoulder 36 provides a more effective wiping action when butter is applied from outlet 15. The outlet edge 38 of side 34 and side 35 is concave to conform to the curvature of an ear of corn. Restricting bosses 20 project into chamber 11.

In use the butter dispenser is loaded by placing inlet 18 of inner telescoping member 16 into inner receptacle 25 of base 24 standing inner telescoping member 16 in an upright position. Plunger 22 is then inserted into chamber 19 of inner telescoping member, sliding until it strikes restricting bosses 21.

A stick of butter or oleomargarine is then inserted at outlet 17 and pressed against plunger 22. The taper of chamber 19 at outlet 17 facilitates insertion of the butter stick. Since commercial butter or oleomargarine sticks are not of uniform cross-section, the taper also acts as a compressor for any stick larger in horizontal dimensions than chamber 19 when a downward force is applied to the butter or oleomargarine stick. When the stick of butter rests against plunger 22 the lower half of the butter stick is within chamber 19.

The upper end of the butter stick is then inserted into inlet 14 of outer telescoping member 10 which is then pressed downward until the butter reaches restricting bosses 20, outer telescoping member 10 encompassing the upper end of inner telescoping member 16. Butter is then dispensed by applying a downward force to tabs 12 and 13 sufficient to overcome the retarding effect of restricting bosses 20, the butter extruding from outlet 15. This procedure is followed until the upper edge of inner telescoping member 16 reaches restricting bosses 20, outer telescoping member 10 almost completely encompassing inner telescoping member 16.

To dispense the remainder of the butter, base 24 is removed and replaced with base-plunger 28, the upper end of plunging member 30 being inserted into inlet 18 of inner telescoping member 16 against plunger 22. When a sufficient downward force is now applied to tabs 12 and 13 plunging member 30 forces plunger 22 toward outlet 15 again extruding butter from outlet 15 until the entire stick is consumed.

The remainder of the butter may also be dispensed without the use of base-plunger 28 by manually pushing plunger 22 toward outlet 15, holding the dispenser at tabs 12 and 13.

Chamber 31 of base-plunger 28 provides a convenient table storage vessel for such items as tooth-picks or corn skewers.

A measured amount of butter may be dispensed when outer telescoping member 10 and inner telescoping member 16 are made of translucent material by measuring the movement of plunger 22 or inner telescoping member 16 relative to outer telescoping member 10, by means of measuring marks 27.

The butter dispenser parts can also be utilized to provide a smaller, non-telescoping dispenser for dispensing less than one-half a stick of butter by inserting the butter at outlet 17 into chamber 19 of inner telescoping member 16 and pressing the butter against restricting bosses 21. Plunger 22 is inserted at outlet 17 on top of the butter, which is then dispensed by applying sufficient force against plunger 22 towards inlet 18 to overcome the retarding effect of restricting bosses 21, the butter then extruding from inlet 18.

By providing an additional plunger 22, a second smaller non-telescoping dispenser can be formed by utilizing said additional plunger in conjunction with outer telescoping member 10.

When the embodiment of outer telescoping member 10 shown in FIGURES 14 and 15 is used the dispenser is an effective corn-buttering device. The necessary force is applied to the dispenser until butter starts to extrude from outlet 15. Butter is then applied by moving the exposed butter against the ear of corn, the curvature of the corn conforming to the concavity of outlet edge 38. Wiping surface 37 of shoulder 36 wipes any excess butter from the surface being buttered.

Butter can similarly be applied to any desired surface by moving the exposed butter against the surface to be coated with butter.

While the dispenser as shown in the drawings is of the construction shown and described, it is understood that the instant invention is not limited to any particular form of construction. Moreover, other changes and modifications of the novel butter dispenser contemplated herein may be made by those skilled in the art without departing from the scope of the instant invention.

In the preceding detailed description and operational description certain vertical and horizontal positions of the dispenser were used to illustrate the present invention. The use of these positions should not be considered as limiting the scope of the invention because other positions may be used.

The invention is more completely understood when applied to a specific field of application and is more clearly illustrated when described to be utilized with butter or oleomargarine. It is to be expressly understood that the present invention may be utilized as a dispenser of other types of food stuffs.

We claim:

1. A food dispenser comprising an inner casing forming an elongated chamber having a substantially rectangular cross-section throughout its length open at both ends, an outer casing also forming an elongated chamber open at both ends, having a substantially rectangular cross-section throughout its length, said inner casing telescoping within said outer casing, and a plunger for said inner casing chamber.

2. A food dispenser comprising an inner casing forming an elongated chamber having a substantially uniform and rectangular cross-section throughout its length open at both ends, an outer casing forming an elongated chamber open at both ends, having a substantially uniform and rectangular cross-section throughout its length, said inner casing telescoping within said outer casing, a plunger for said inner casing chamber and stand means for holding said telescoping casings.

3. A food dispenser comprising an inner casing forming an elongated chamber having a substantially uniform and rectangular cross-section throughout its length open at both ends, an outer casing forming an elongated chamber open at both ends, having a substantially uniform and rectangular cross-section throughout its length, said inner casing telescoping within said outer casing, a plunger for said inner casing chamber, stand means for holding said telescoping casings and a secondary plunger slidably insertable into the end of said inner casing chamber, said plunger being of substantially the same length as said chamber.

4. A food dispenser comprising an inner casing with relatively thin walls forming an elongated chamber having a substantially uniform and rectangular cross-section throughout its length, open at both ends, an outer casing forming an elongated chamber open at both ends, having a substantially uniform and rectangular cross-section throughout its length, said inner casing telescoping within said outer casing, restricting means near one end of said outer casing chamber to prevent said inner casing from sliding out said end and to retard the movement of food stuff from said end and a plunger for said inner casing chamber.

5. A food dispenser comprising an inner casing with relatively thin walls forming an elongated chamber having a substantially uniform and rectangular cross-section throughout its length, open at both ends, one end of said chamber flaring outward forming an opening larger than the cross-section of said chamber, an outer casing forming an elongated chamber also open at both ends, having a substantially uniform and rectangular cross-section throughout its length, said inner casing telescoping within said outer casing, restricting means near one end of said outer casing chamber to prevent said inner casing from sliding out said end and to retard the movement of food stuff from said end, and a plunger for said inner casing chamber.

6. A food dispenser comprising an inner casing with relatively thin walls forming an elongated chamber having a substantially uniform rectangular cross-section throughout its length, open at both ends, an outer casing forming an elongated chamber open at both ends, having a substantially uniform and rectangular cross-section throughout its length, said inner casing telescoping within said outer casing, one or more bosses projecting into said outer casing chamber near one end, forming an unimpeded rectangular cross-section smaller than the cross-section of said inner casing chamber, and a plunger for said inner casing chamber.

7. A food dispenser comprising an inner casing with relatively thin walls forming an elongated chamber having a substantially uniform and rectangular cross-section throughout its length, open at both ends, forming an inlet and an outlet, the outlet end of said chamber flaring outward, forming an opening larger than the cross-section of said chamber, an outer casing forming an elongated chamber, having a substantially uniform and rectangular cross-section throughout its length, open at both ends and forming an inlet and outlet, said inner casing telescoping within said outer casing, the outlet of each casing facing the same direction, one or more bosses projecting into said outer casing chamber, near the outlet end, forming an unimpeded rectangular cross-section smaller than the cross-section of said inner casing chamber, a plunger for said inner casing chamber, stand means for holding said telescoping casings, and a secondary plunger slidably insertable into the inlet end of said inner casing chamber, said plunger being of substantially the same length as said chamber.

8. A food dispenser comprising an inner casing with relatively thin walls forming an elongated chamber having a substantially uniform and rectangular cross-section throughout its length, open at both ends, forming an inlet and an outlet, the outlet end of said chamber flaring outward, forming an opening larger than the cross-section of said chamber, an outer casing forming an elongated chamber, having a substantially uniform and rectangular cross-section throughout its length, open at both ends and forming an inlet and outlet, said inner casing telescoping within said outer casing, the outlet of each casing facing the same direction, one or more bosses projecting into said outer casing chamber, near the outlet end, forming an unimpeded rectangular cross-section smaller than the cross-section of said inner casing chamber, a plunger for said inner casing chamber, stand means removably encompassing the inlet end of said inner casing and a secondary plunger uniform in cross-section throughout its length, substantially the same in cross-section and length as the said inner casing chamber, one end mounted on a base and the other end slidably insertable into the inlet end of said inner casing chamber when said stand means is removed.

9. The food dispenser as set forth in claim 8 wherein said bosses project from each side of said chamber at the outlet end of said chamber.

10. The food dispenser as set forth in claim 8 wherein said bosses project from each corner of said rectangular chamber at the outlet end, forming an octagonal outlet to said chamber.

11. The food dispenser as set forth in claim 8 wherein said boss is a shoulder extending around the entire perimeter of said chamber near the outlet end.

12. A food dispenser comprising an inner casing with relatively thin walls forming an elongated chamber having a substantially uniform and rectangular cross-section throughout its length, open at both ends, forming an inlet and an outlet, the outlet end of said chamber flaring outward, forming an opening larger than the cross-section of said chamber, an outer casing forming an elongated chamber, having a substantially uniform and rectangular cross-section throughout its length, open at both ends and forming an inlet and outlet, said inner casing telescoping within said outer casing, the outlet of each casing facing the same direction, a plurality of bosses projecting into said outer casing chamber at the outlet end of said chamber making the unimpeded rectangular cross-section at the outlet end of said chamber less than the cross-section of said inner casing chamber, a plunger similar in cross-section to the chamber in said inner casing, slidably mounted in said chamber, stand means for holding said telescoping casings, and a secondary plunger uniform in cross-section throughout its length, substantially the same in cross-section and length as the said inner casing chamber, one end mounted on a base and the other end slidably insertable in the inlet end of said inner casing chamber.

13. A food dispenser comprising an inner casing with relatively thin walls forming an elongated chamber having a substantially uniform and rectangular cross-section throughout its length, open at both ends, forming an inlet and an outlet, the outlet end of said chamber flaring outward, forming an opening larger than the cross-section of said chamber, an outer casing forming an elongated chamber, having a substantially uniform and rectangular cross-section throughout its length, open at both ends and forming an inlet and an outlet, said inner casing telescoping within said outer casing, the outlet of each casing facing the same direction, a plurality of bosses projecting into said outer casing chamber at the outlet end of said chamber making the unimpeded rectangular cross-section at the outlet end of said chamber less than the cross-section of said inner casing chamber, gripping means on the external sides of said outer casing, a plunger similar in cross-section to the chamber in said inner casing, slidably mounted in said chamber, a stand means removably encompassing the inlet end of said inner casing, and a secondary plunger uniform in cross-section throughout its length, substantially the same in cross-section and length as the said inner casing chamber, one end mounted on a base and the other end slidably insertable in the inlet end of said inner casing chamber when said stand means is removed.

14. A butter or oleomargarine dispenser comprising an inner casing of translucent material with relatively thin walls forming an elongated chamber having a substantially uniform and rectangular cross-section throughout its length, open at both ends forming an inlet and an outlet, the outlet end of said chamber flaring outward, forming an opening larger than the cross-section of said chamber, an outer casing of translucent material forming an elongated chamber having a substantially uniform and rectangular cross-section throughout its length, open at both ends, forming an inlet and an outlet, said inner casing telescoping within said outer casing, the outlet of each casing facing the same direction, a plurality of bosses projecting into said outer casing chamber near the outlet end, forming an opening, the unimpeded rectangular area of said opening being smaller than the cross-section of said inner casing chamber, the external surface of said outer casing having measured graduations, one or more gripping projections on the external sides of said outer casing, a plunger similar in cross-section to the chamber in said inner casing, slidably mounted in said chamber, a stand forming two receptacles, one adaptable to receive and bindable to the inlet of said inner casing, and the second adaptable to receive and bindable to the outlet end of said outer casing and a secondary plunger uniform in cross-section throughout its length, substantially the same in cross-section and length as the said inner casing chamber, one end mounted on a base and the other end slidably insertable into the inlet end of said inner casing chamber.

15. A butter or oleomargarine dispenser comprising an inner casing of translucent material with relatively thin walls forming an elongated chamber having a substantially uniform and rectangular cross-section throughout its length, open at both ends forming an inlet and an outlet, the outlet end of said chamber flaring outward, forming an opening larger than the cross-section of said chamber, an outer casing of translucent material forming an elongated chamber having a substantially uniform and rectangular cross-section throughout its length, open at both ends, forming an inlet and an outlet, said inner casing telescoping within said outer casing, the outlet of each casing facing the same direction, a plurality of bosses projecting into said outer casing chamber near the outlet end, forming an opening, the unimpeded rectangular area of said opening being smaller than the cross-section of said inner casing chamber, the external surface of said outer casing having measured graduations, one or more gripping projections on the external sides of said outer casing, the outlet edge of two opposed walls of said outer casing being concave to conform to the outer surface of an ear of corn, a plunger similar in cross-section to the chamber in said inner casing slidably mounted in said chamber, a stand forming two receptacles, one adaptable to receive and bindable to the inlet end of said inner casing, and the second adaptable to receive and bindable to the outlet end of said outer casing, and a secondary plunger uniform in cross-section throughout its length, substantially the same in cross-section and length as the said inner casing chamber, one end mounted on a base and the other end slidably insertable into the inlet end of said inner casing chamber.

16. A butter or oleomargarine dispenser comprising an inner casing of translucent material with relatively thin walls forming an elongated chamber having a substantially uniform and rectangular cross-section throughout its length, open at both ends forming an inlet and an outlet, the outlet end of said chamber flaring outward, forming an opening larger than the cross-section of said chamber, an outer casing of translucent material forming an elongated chamber having a substantially uniform and rectangular cross-section through out its length, open at both ends, forming an inlet and an outlet, said inner casing telescoping within said outer casing, the outlet of each casing facing the same direction, a plurality of bosses projecting into said outer casing chamber near the outlet end, forming an opening, the unimpeded rectangular area of said opening being smaller than the cross-section of said inner casing chamber, the external surface of said outer casing having measured graduations, one or more gripping projections on the external sides of said outer casing, the outlet edge of two opposed walls of said outer casing being concave to conform to the outer surface of an ear of corn, said outer casing also having a shoulder around its upper perimeter increasing the area of the outlet edge of said casing, a plunger similar in cross-section to the chamber in said inner casing slidably mounted in said chamber, a stand forming two receptacles, one adaptable to receive and bindable to the inlet end of said inner casing, and the second adaptable to receive and bindable to the outlet end of said outer casing, and a secondary plunger uniform in cross-section throughout its length, substantially the same in cross-sections and length as the said inner casing chamber, one end mounted on a base and the other end slidably insertable into the inlet end of said inner casing chamber.

17. A butter or oleomargarine dispenser comprising an inner casing of translucent material with relatively thin walls forming an elongated chamber having a substantially uniform and rectangular cross-section throughout its length, open at both ends forming an inlet and an outlet, the outlet end of said chamber flaring outward, forming an opening larger than the cross-section of said chamber, one or more bosses projecting into said chamber near the inlet, an outer casing of translucent material forming an elongated chamber having a substantially uniform and rectangular cross-section throughout its length, open at both ends, forming an inlet and an outlet, said inner casing telescoping within said outer casing, the outlet of each casing facing the same direction, a plurality of bosses projecting into said outer casing chamber near the outlet end, forming an opening, the unimpeded rectangular area of said opening being smaller than the cross-section of said inner casing chamber, the external surface of said outer casing having measured graduations, one or more gripping projections on the external sides of said outer casing, the outlet edge of two opposed walls of said outer casing being concave to conform to the outer surface of an ear of corn, said outer casing also having a shoulder around its upper perimeter increasing the area of the outlet edge of said casing, a plunger similar in cross-section to the chamber in said inner casing slidably mounted in said chamber, a stand forming two receptacles, one adaptable to receive and bindable to the inlet end of said inner casing, and the second adaptable to receive and bindable to the outlet end of said outer casing, and a secondary plunger uniform in cross-section throughout its length, substantially the same in cross-sections and lengths as the said inner casing chamber, one end mounted on a base and the other end slidably insertable into the inlet end of said inner casing chamber.

18. A butter or oleomargarine dispenser comprising an inner casing of translucent material with relatively thin walls forming an elongated chamber having a substantially uniform and rectangular cross-section throughout its length, open at both ends forming an inlet and an outlet, the outlet end of said chamber flaring outward, forming an opening larger than the cross-section of said chamber, an outer casing of translucent material forming an elongated chamber having a substantially uniform and rectangular cross-section throughout its length, open at both ends, forming an inlet and an outlet, said inner casing telescoping within said outer casing, the outlet of each casing facing the same direction, a plurality of bosses projecting into said outer casing chamber near the outlet end, forming an opening, the unimpeded rectangular area of said opening being smaller than the cross-section of said inner casing chamber, the external surface of said outer casing having measured graduations, one or more gripping projections on the external sides of said outer casing, the outlet edge of two opposed walls of said outer casing being concave to conform to the outer surface of an ear of corn, said outer casing also having a shoulder around its upper perimeter increasing the area of the outlet edge of said casing, a plunger similar in cross-section to the chamber in said inner casing slidably mounted in said chamber, a stand forming two receptacles, one adaptable to receive and bindable to the inlet end of said inner casing, and the second adaptable to receive and bindable to the outlet end of said outer casing, and a secondary plunger uniform in cross-section throughout its length, substantially the same in cross-sections and length as the said inner casing chamber, one end mounted on a base and the other end slidably insertable into the inlet end of said inner casing chamber, said plunger also forming a chamber open at the unmounted end of said plunger.

19. A butter or oleomargarine dispenser comprising an inner casing with relatively thin walls forming a vertically elongated chamber having a substantially uniform and rectangular cross section throughout its length, open at the bottom and the top, the upper end of said chamber flaring outward, forming a top opening larger than the cross-section of said chamber, an outer casing forming a vertically elongated chamber open at the bottom and the top, having a substantially uniform and rectangular cross-section throughout its length, said inner casing telescoping within said outer casing, a plurality of bosses projecting into said outer casing chamber at the upper end of said chamber making the unimpeded rectangular cross-section at the upper end of said chamber less than the cross-section of said inner casing chamber, a plunger similar in cross-section to the chamber in said inner casing, slidably mounted in said chamber, a stand encompassing the lower end of said inner casing, and a secondary plunger uniform in cross-seciton throughout its length, substantially the same in cross-section and length as the said inner casing chamber, the lower end mounted on a base and the upper end slidably insertable in the lower end of said inner casing chamber.

References Cited in the file of this patent
UNITED STATES PATENTS

| | | |
|---|---|---|
| D. 194,883 | Mattar et al. | Mar. 26, 1963 |
| 2,458,120 | Volpini | Jan. 4, 1949 |
| 2,581,745 | Amorino et al. | Jan. 8, 1952 |